US011877658B2

(12) United States Patent
Ratermann

(10) Patent No.: US 11,877,658 B2
(45) Date of Patent: Jan. 23, 2024

(54) GAS CYLINDER TANK STORAGE RACK WITH METHOD OF SIGNALING TANK INVENTORY

(71) Applicant: Ratermann Manufacturing, Inc., Livermore, CA (US)

(72) Inventor: George W. Ratermann, Livermore, CA (US)

(73) Assignee: Ratermann Manufacturing, Inc., Livermore, CA (US)

(*) Notice: Subject to any disclaimer, the term of this patent is extended or adjusted under 35 U.S.C. 154(b) by 0 days.

(21) Appl. No.: 17/894,956

(22) Filed: Aug. 24, 2022

(65) Prior Publication Data

US 2023/0389704 A1 Dec. 7, 2023

Related U.S. Application Data

(60) Provisional application No. 63/350,000, filed on Jun. 7, 2022.

(51) Int. Cl.
*A47B 97/00* (2006.01)
*A47B 81/00* (2006.01)
*F17C 13/08* (2006.01)

(52) U.S. Cl.
CPC ............ *A47B 97/00* (2013.01); *A47B 81/007* (2013.01); *F17C 13/084* (2013.01); *A47B 2220/0091* (2013.01)

(58) Field of Classification Search
CPC .................. A47B 81/007; A47B 97/00; A47B 2220/0091; F17C 13/084
See application file for complete search history.

(56) References Cited

U.S. PATENT DOCUMENTS 2,011,347 A * 8/1935 Ragonnet ................ B60P 3/222 222/3
2,288,622 A * 7/1942 Heigis .................. A47B 81/007 211/75
3,065,857 A * 11/1962 Sanders ................ F17C 13/084 211/85.19
3,602,368 A * 8/1971 Gould ................... F17C 13/084 211/85.18
3,791,403 A * 2/1974 Folkerth ............... F17C 13/084 211/85.18

(Continued)

FOREIGN PATENT DOCUMENTS

GB 813997 A * 5/1959

*Primary Examiner* — Stanton L Krycinski
(74) *Attorney, Agent, or Firm* — Mark Protsik; Thomas Schneck

(57) ABSTRACT

A gas cylinder tank storage rack uses groups of load cells to sense the presence and fill state of tanks in storage locations on shelves. Tanks can be stored lying down horizontally on parallel rails. The rails are hinged to a crossbar of a frame of the rack and rest at an opposite end upon load cells attached to another crossbar of the frame. Multiple tanks can also be stored upright upon platforms resting upon at least one pair of load cells affixed to front and/or back crossbars of the frame. Sensor outputs from pairs of cells are processed in tandem to yield an average load value. The measured load in relation to threshold values determine the number and fill state of tanks on the shelves. Tank inventory can be communicated to a server to handle ordering of replacement tanks when needed.

19 Claims, 5 Drawing Sheets

(56) References Cited

U.S. PATENT DOCUMENTS

| | | | | | |
|---|---|---|---|---|---|
| 4,295,431 | A * | 10/1981 | Stavlo | F17C 13/084 | 294/67.1 |
| 4,391,377 | A * | 7/1983 | Ziaylek, Jr. | A47B 81/007 | 206/443 |
| 4,431,107 | A * | 2/1984 | Bergstrom | A47B 81/007 | 211/59.4 |
| 4,481,972 | A * | 11/1984 | Stavlo | B66C 1/62 | 137/376 |
| 4,506,796 | A * | 3/1985 | Thompson | A47B 81/007 | 108/55.3 |
| 4,564,109 | A * | 1/1986 | Stavlo | B65D 19/44 | 294/67.1 |
| 4,899,968 | A * | 2/1990 | Eaglin | A47F 5/02 | 248/131 |
| 5,074,421 | A * | 12/1991 | Coulter | F17C 13/084 | 211/163 |
| 5,176,265 | A * | 1/1993 | Bennett | A47F 7/28 | 137/376 |
| 5,292,012 | A * | 3/1994 | Davis | B60P 3/224 | 220/1.5 |
| 5,385,263 | A * | 1/1995 | Kirk | F17C 1/16 | 206/443 |
| 5,671,362 | A | 9/1997 | Cowe et al. | | |
| 6,050,538 | A * | 4/2000 | Marrow | A47B 81/007 | 248/500 |
| 6,059,127 | A * | 5/2000 | Bennett | B62B 3/104 | 211/85.18 |
| 6,135,297 | A * | 10/2000 | DeShazo | A47B 81/007 | 211/74 |
| 6,196,255 | B1 * | 3/2001 | Poillucci | F24C 3/062 | 137/259 |
| 6,346,680 | B1 | 2/2002 | Takahashi et al. | | |
| 6,360,903 | B1 * | 3/2002 | Flores | B65D 19/385 | 211/85.22 |
| 6,536,722 | B2 * | 3/2003 | Sadowski | F17C 13/084 | 248/154 |
| 6,685,404 | B2 | 2/2004 | Udivich et al. | | |
| 6,708,719 | B2 * | 3/2004 | Idoguchi | F17C 13/084 | 222/135 |
| 6,786,229 | B1 * | 9/2004 | Friedlmeier | F17C 1/00 | 137/259 |
| 6,786,245 | B1 * | 9/2004 | Eichelberger | F17C 5/06 | 141/2 |
| 7,017,741 | B1 * | 3/2006 | Williamson | F17C 13/084 | 206/386 |
| 7,070,372 | B2 * | 7/2006 | Denike | F17C 13/084 | 211/85.18 |
| 7,137,474 | B2 * | 11/2006 | Yokote | F17C 13/084 | 248/500 |
| 7,275,902 | B1 * | 10/2007 | Klotz | B60P 3/055 | 410/32 |
| 7,543,667 | B2 * | 6/2009 | Hwang | H01M 8/04201 | 248/500 |
| 7,690,515 | B2 * | 4/2010 | Thibodeau | A47B 81/007 | 211/11 |
| 7,748,545 | B2 * | 7/2010 | Johnson | F17C 13/084 | 211/163 |
| 8,016,300 | B2 * | 9/2011 | Cramer | B65G 7/04 | 137/899.3 |
| 8,146,761 | B2 * | 4/2012 | Fawley | B65D 88/128 | 220/1.5 |
| 9,089,214 | B2 * | 7/2015 | Kelly | A47F 1/12 | |
| 9,445,670 | B1 * | 9/2016 | Stiefel | H05K 5/0017 | |
| 9,453,611 | B2 | 9/2016 | Suman | | |
| 9,499,047 | B2 * | 11/2016 | Milton | F17C 13/084 | |
| 9,622,575 | B2 * | 4/2017 | Vickary | E05C 19/002 | |
| 9,752,726 | B2 * | 9/2017 | Frenal | F17C 13/084 | |
| 9,880,320 | B2 | 1/2018 | Ratermann | | |
| D827,764 | S * | 9/2018 | Mangeot-Gehin | D23/205 | |
| 10,219,621 | B2 * | 3/2019 | Wilhelmsen | B65D 19/0097 | |
| 10,458,599 | B2 * | 10/2019 | Baune | F17C 13/084 | |
| 10,817,835 | B2 | 10/2020 | Ratermann | | |
| 10,817,925 | B2 | 10/2020 | Ratermann | | |
| 11,063,631 | B2 * | 7/2021 | Visconti | H02J 3/00 | |
| 11,320,094 | B2 * | 5/2022 | Choi | F17C 13/04 | |
| 2007/0050271 | A1 | 3/2007 | Ufford et al. | | |
| 2008/0110784 | A1 * | 5/2008 | Nowicki | F17C 13/084 | 206/446 |
| 2009/0084739 | A1 * | 4/2009 | Shock | F17C 13/084 | 211/75 |
| 2013/0337737 | A1 * | 12/2013 | DeVarney | F17C 13/084 | 454/347 |
| 2014/0290797 | A1 * | 10/2014 | Kriese | F17C 1/00 | 141/237 |
| 2016/0113396 | A1 * | 4/2016 | Wilhelmsen | B65D 19/385 | 211/72 |
| 2017/0221136 | A1 | 8/2017 | Ratermann | | |
| 2018/0183599 | A1 | 6/2018 | Fox et al. | | |
| 2020/0196758 | A1 * | 6/2020 | Segas | A47B 81/007 | |
| 2022/0354251 | A1 * | 11/2022 | Kim | B65G 1/0485 | |

* cited by examiner

GAS CYLINDER TANK STORAGE RACK WITH METHOD OF SIGNALING TANK INVENTORY

CROSS-REFERENCE TO RELATED APPLICATION

This application claims priority under 35 U.S.C. 119(e) from U.S. Provisional Application 63/350,000 filed Jun. 7, 2022.

TECHNICAL FIELD

The invention relates to gas cylinder tank inventory management using a sensor network to determine tank presence or absence at defined gas cylinder storage locations, as well as tank status as substantially full or empty, and relates to tank inventory signaling for ordering and procurement of replacement tanks whenever tank inventory falls below a defined threshold.

BACKGROUND ART

The inventor has several prior U.S. patents covering various aspects of gas cylinder tank inventory management, namely U.S. Pat. Nos. 9,880,320, and 10,817,925. In the '835 patent, a tank inventory signaling system has storage racks with parallel spaced apart rails that support horizontally stored propane tanks. Weight sensors or load cells associated with each rail detect tank presence or absence at each storage location and operate in tandem to determine whether a tank is full or empty. Specifically, signaling of full and empty tanks is established by calibration using two different load cells, where one load cell is more sensitive to loads than the other.

SUMMARY DISCLOSURE

The present invention contemplates a plurality of load cells that work in tandem (e.g., in pairs) as weight sensors to register the presence and fill status of gas cylinder storage tanks on shelves of a storage rack.

In a first 'forklift cage' embodiment, pairs of parallel spaced apart tank supporting rails are provided with one weight sensor associated with each rail at the same rail location. The rails are hinged support arms, with a hinge at one end of each arm and a weight sensor at the other end of each arm, to provide a more consistent weight measurement. The two arms support a horizontal tank and the two weight sensors for each tank are connected in parallel, which results in a microcontroller connected to those sensors seeing an average value of the two weight sensors. Three different threshold values are used. From zero to a first threshold value indicated no tank is present; between first and second threshold values indicates an empty tank is present; between second and third threshold values indicates a full tank is present; and above the third threshold is assumed to be a blowout value (i.e., sensor reading error).

In a second 'barbecue cage' embodiment, tank supporting platforms are provided in which multiple tanks can be stored in upright positions on each platform (such as two tanks per platform) with at least one pair (and preferably two pairs) of identical weight sensors located symmetrically beneath the platform to establish the number of tanks and their full or empty status. With two pairs of sensors, there are two corresponding weight zones or tank places on each platform or plate and two pairs of load cells are at each end, front and back, of a platform. As in the first 'forklift' embodiment, the load cells are paired up to get an average value. The total value of the two pairs of load cells indicates tank status using five threshold values: from zero to a first threshold indicates no tank is present; between first and second threshold values indicates the presence of a single empty tank; between second and third threshold values there are possibly two empty tanks or one full tank; between third and fourth threshold values indicates one empty tank and one full tank; between fourth and fifth thresholds indicates two full tanks; and above the fifth threshold is regarded as a blowout value (i.e., sensor reading error).

To resolve the ambiguity between second and third threshold values, when two pairs of sensors are used, the difference between measurements between the front and back pairs of sensors is determined. A differential value that exceeds a differential threshold indicates the presence of one full tank, else below that differential threshold there are two empty tanks.

Because each group of weight sensors are connected in tandem to provide an average value of the two, they each effectively act together as a single weight sensor. However, two physical sensors are preferred for their contribution to the robustness of the measurement system.

DETAILED DESCRIPTION

Figure 1A:
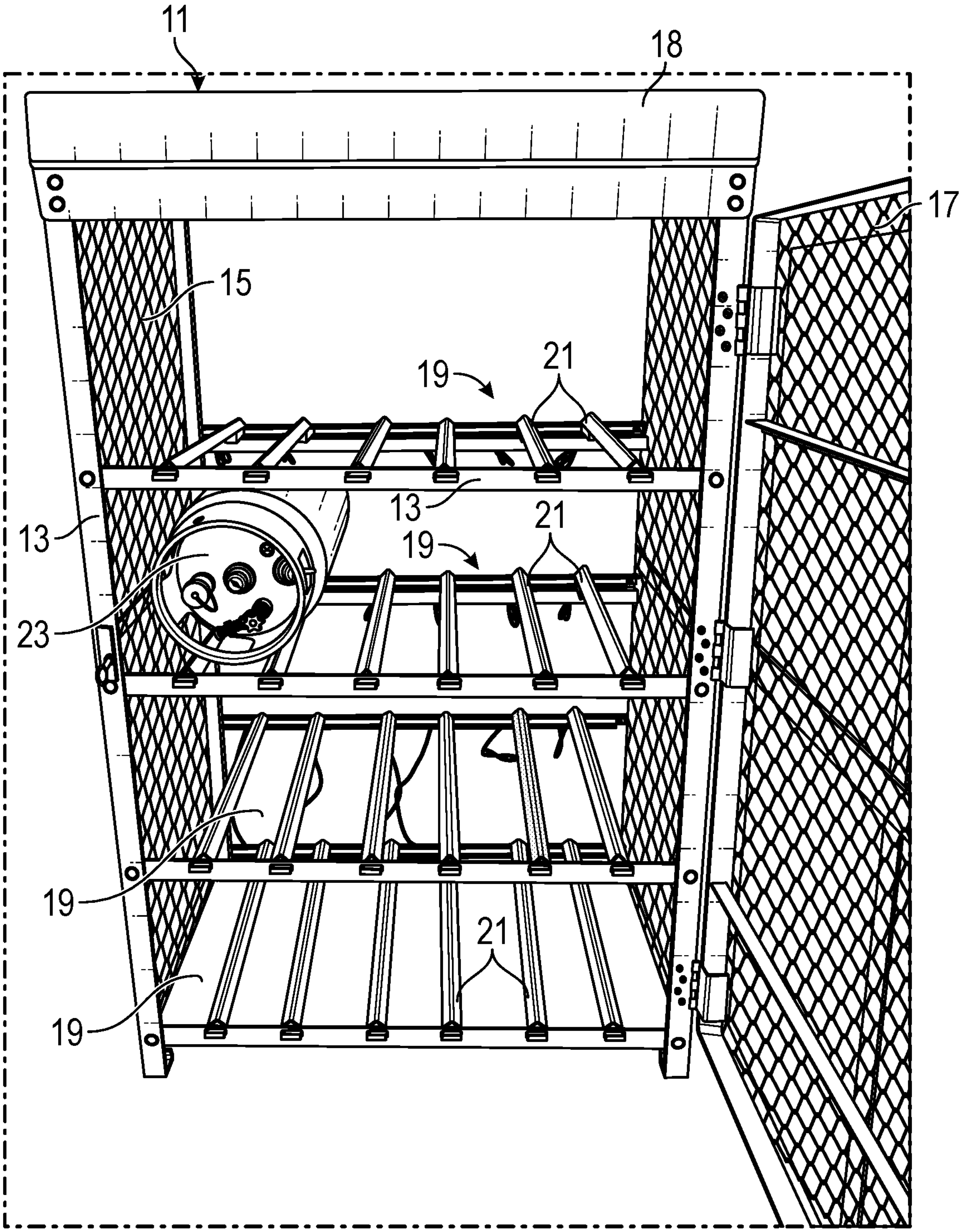
FIG. 1A is an overall perspective view of a first embodiment of a gas cylinder tank storage rack in accord with the invention.

In FIG. 1A, an entire gas cylinder tank storage rack 11 in accord with a first embodiment of the invention is seen. The rack 11 has a frame structure 13 which may also include grill work 15 and a door 17 for enclosing a perimeter of the rack 11 in a semi-open configuration allowing free air circulation so the interior of the rack will not overheat. Likewise, the top of the rack may have a solid or slatted roof 18 for providing some shading of tanks from direct sunlight. These specifics of the rack can vary in design. The frame structure 13 includes a plurality of shelves 19, one above another, for holding multiple layers of horizontally disposed gas cylinder tanks 23. Here, four shelves 19 are seen for holding four rows or layers of tanks 23, one row above another. Each shelf 19 has a set of parallel supporting rails 21 upon which the tanks rest. Accordingly, a gas cylinder tank 23 disposed horizontally on one of the shelves, is supported by two parallel rails 21. Adjacent pairs of parallel rails 21 on the same shelf and on different shelves can support other tanks 23. As seen here by way of example, each shelf 19 can have six parallel rails 21 for supporting three tanks per shelf. Each of three pairs of rails 21 is spaced apart by a distance less than a diameter of a tank 23 lying on its side that the rails are intended to support. Pairs of rails 21 may be spaced apart from each other by a distance that allows some clearance between adjacent tanks 23. Both the number of shelves 19 and the number of pairs of rails 21 (and corresponding tanks storage locations) per shelf can vary in different implementations of the storage rack 11.

Figure 1B:
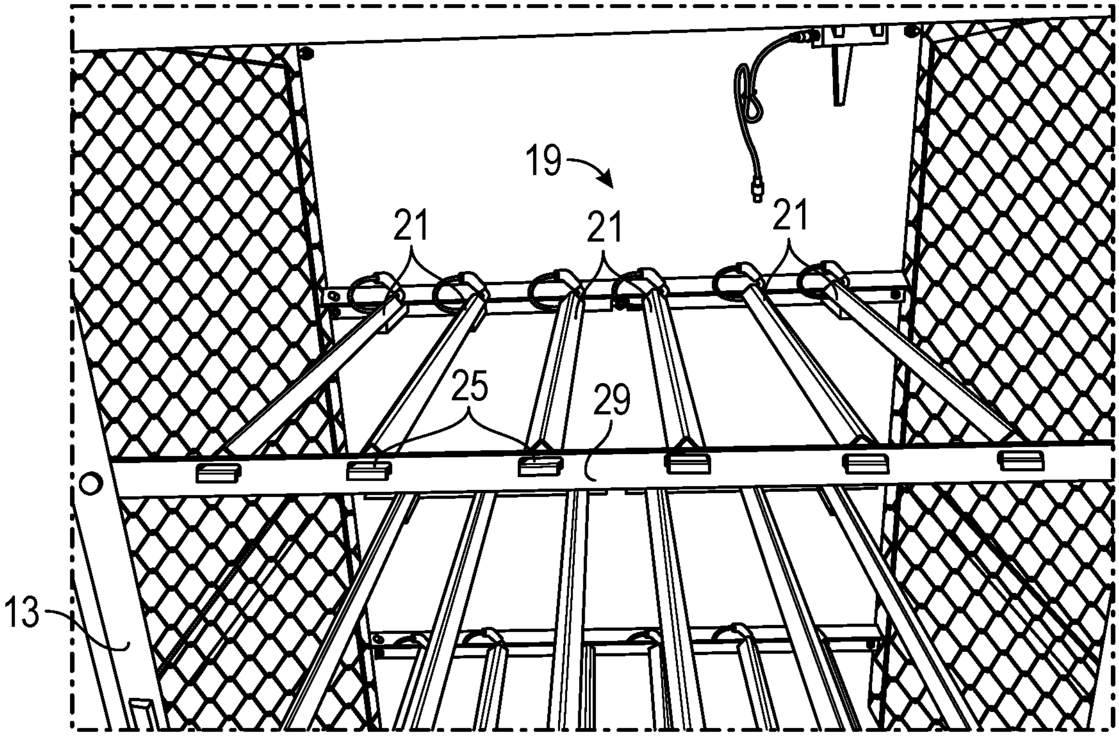
FIG. 1B is a close-up perspective view of a shelf of the storage rack of FIG. 1A showing parallel supporting rails for horizontally disposed tanks.
Figure 1C:
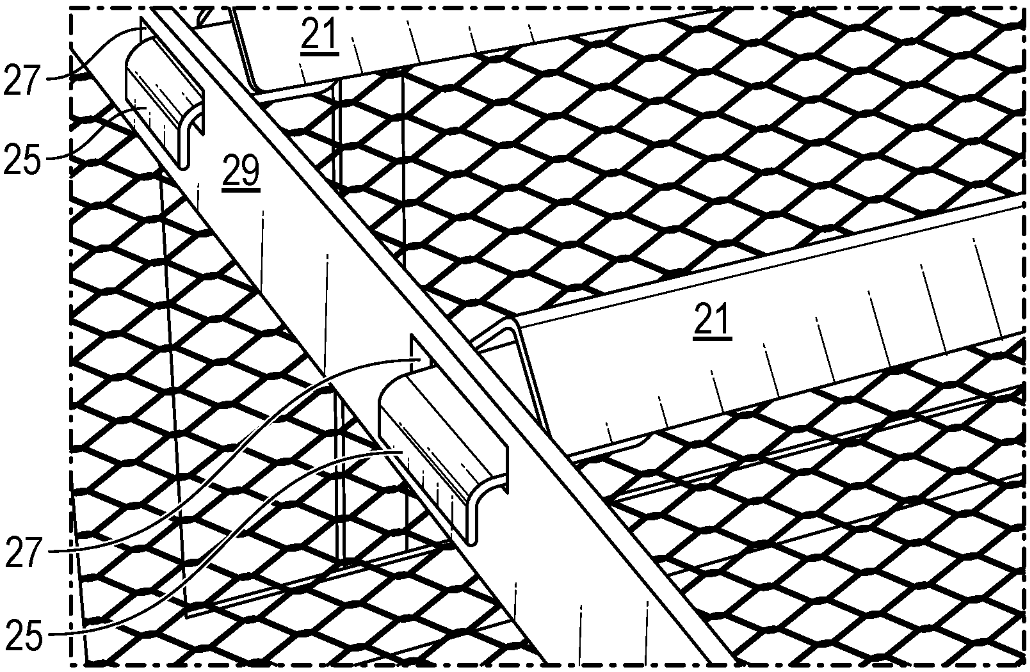
FIG. 1C is a close-up perspective view of hinges on a front end of the supporting rails in FIG. 1B.

In FIG. 1B, a closeup of the rails 21 is seen to be in the form of spaced apart parallel arms that are attached in the front with hinges 25 to a horizontal front crossbar 29 that is part of the frame 13. In one possible configuration, the hinges 25 can be seen clearly in FIG. 1C as downwardly curved endpieces that are fitted into slots 27 of the crossbar 29 to permit a slight amount of vertical pivoting, but only so as much as needed to accommodate the load cells in back.

Figure 1D:
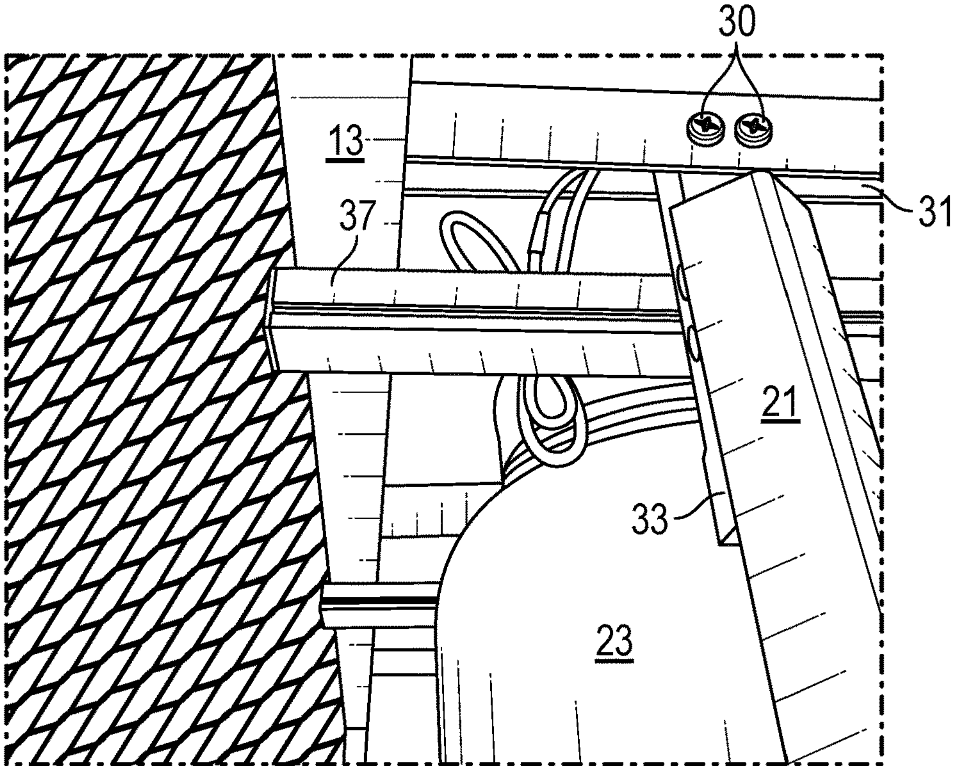
FIG. 1D is a close-up top perspective view of a back end of a supporting rail in FIG. 1B.
Figure 1E:
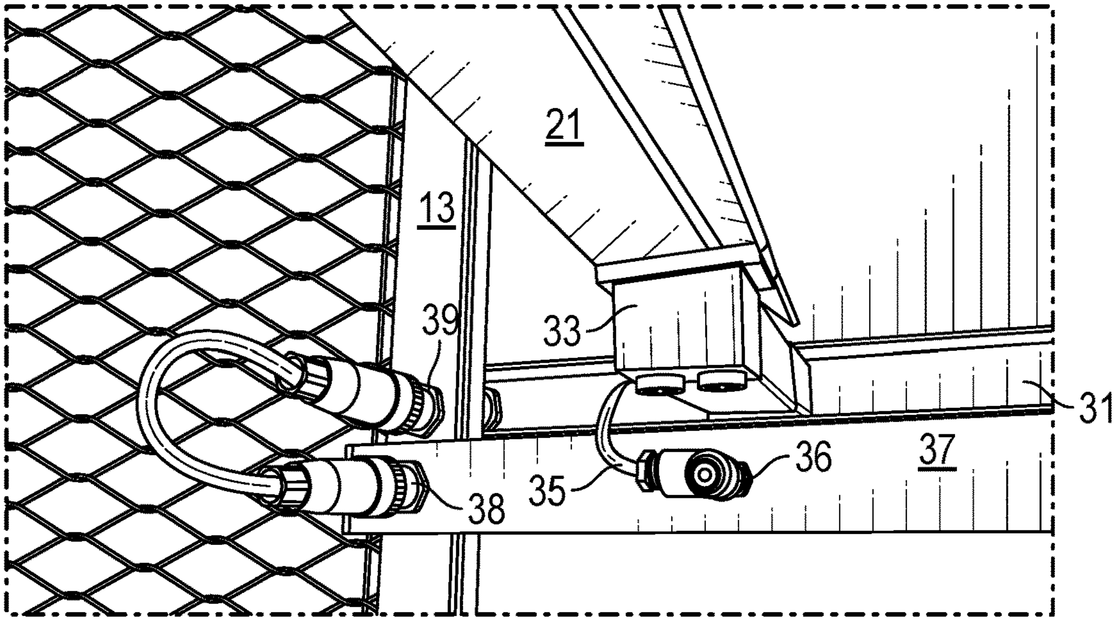
FIG. 1E is a close-up underside perspective view of the back of the supporting rail of FIG. 1D, resting upon a load sensor and showing signal connections between the load sensor and a frame of the storage rack of FIG. 1A.

FIGS. 1D and 1E show the back end of an arm 21 resting on one of these load cells 33, which are fixed with bolts 30 to a horizontal back crossbar 31 to project forward under the rail arm 21. As seen in FIG. 1E, the back of the rail arm 21 rests directly on the top of the load cell 33. When a cylinder is placed onto the rails 21, the weight of the cylinder causes the back end of each rail arm 21 to press downward so that the weight is measured by the pair of load cells 33 upon which the two parallel arms 31 rest. Signal lines 35 connected to a jack 36 in a horizontal conduit 37 convey load sensor output signals from each load cell 33. Shelf-to-frame plug-in connectors 38-39 convey the signals from the load cells 33 of each shelf via the frame 13 to a processor associated with this tank storage rack and/or others for processing.

Specifically, the two load cells 31 for the parallel rails 31 are treated in parallel by a microprocessor that is connected to receive the signals from those load cells 33 to derive an average signal value from those two weight sensors 33. Then, three different threshold values can be used to obtain a tank status for each storage location in the rack 11. The load cell signal analysis determines whether a tank is present at a storage location defined by the parallel rails 21 and, if present, whether such tank is full or empty. The threshold values can be easily calibrated by loading or removing a full or empty tank 23 and then registering the resulting load cell signal values obtained from the corresponding pair of load cells 33. An averaged load cell signal value from zero to a first threshold level indicates that no tank is present on the pair of rails. A signal value between first and second threshold levels indicates that an empty tank is present. A signal value between second and third threshold levels indicates that a full tank is present. A signal value above a third threshold is assumed to be a blowout value (i.e., sensor reading error). It is noted that in the rare case when one of the two load cells 31 fails, the processor will designate the faulty sensor for repair or replacement and could fall back upon suitably adjusted threshold levels for the one still functioning load cell until such repair or replacement can be completed.

Figure 2A:
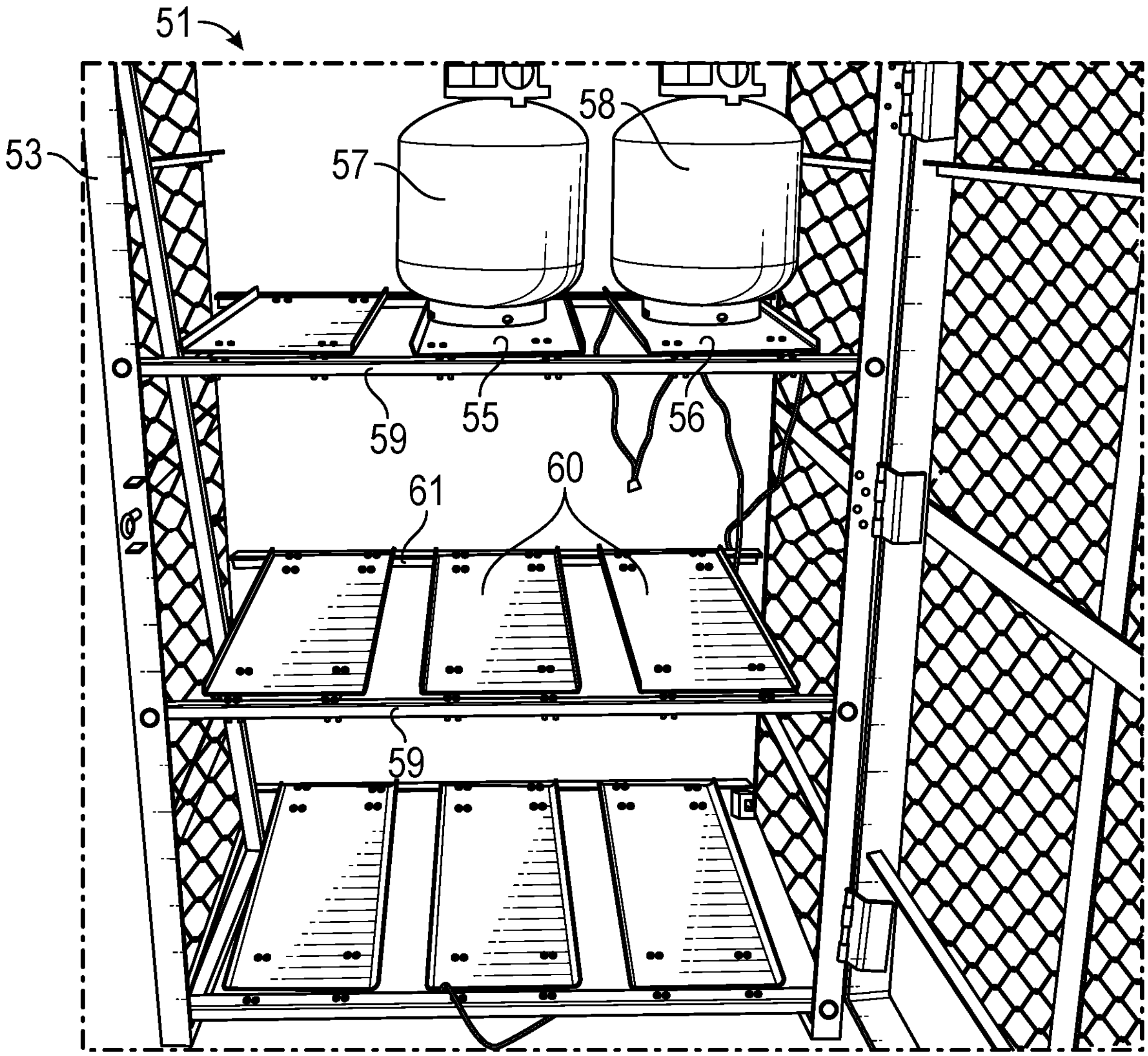
FIG. 2A is an overall perspective view of a second embodiment of a gas cylinder tank storage rack in accord with the invention.

In FIG. 2A, a gas cylinder tank storage rack 51 in accord with a second embodiment of the invention is seen. This embodiment has a frame structure 53 similar in most respects to that in FIGS. 1A-1E, except that it has platforms 55, 56, 60, etc. for the shelves that support upright gas cylinder tanks 57, 58, etc. as shown. Although FIG. 2A depicts a rack 51 that currently has one tank 57 on one of the platforms 55 and a second tank 58 on another of the platforms 56, each of the platforms can hold up to two of the cylinder tanks. Each shelf has front and back crossbars 59 and 61 that are part of the rack's frame structure 53 and upon which the various platforms 60 rest. Again, the number of platforms per shelf (three in this example) can vary in different implementations, as can the number of rows or shelves (again three in this example) in the storage rack 51.

Figure 2B:
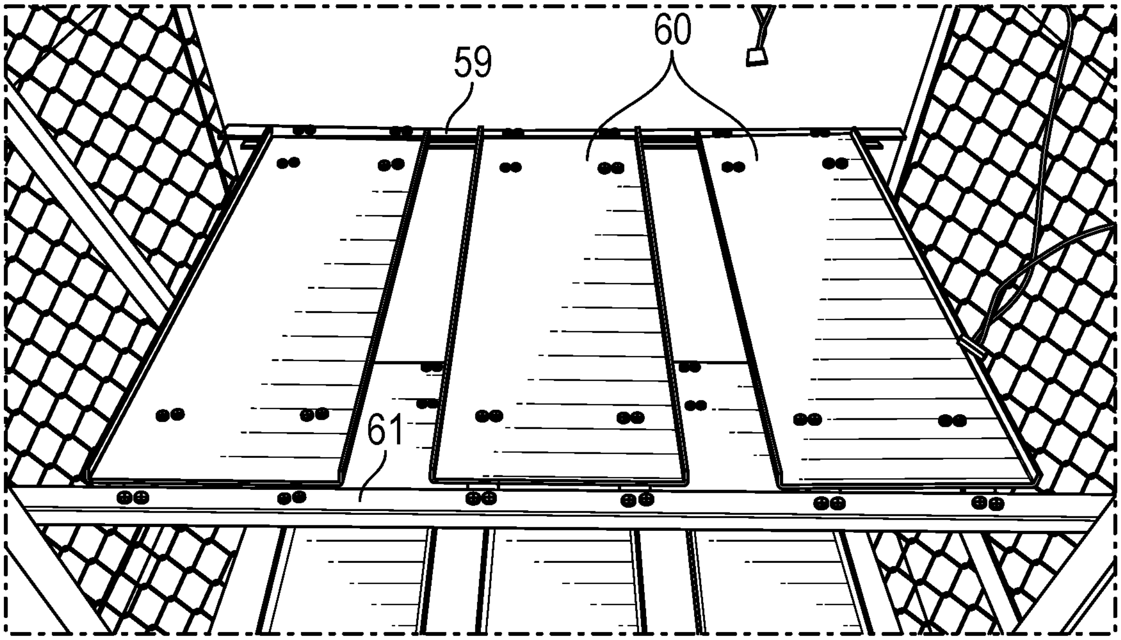
FIG. 2B is a close-up perspective view of a shelf of the storage rack of FIG. 2A showing side-by-side platforms for supporting two, upright disposed, tanks per platform.
Figure 2C:
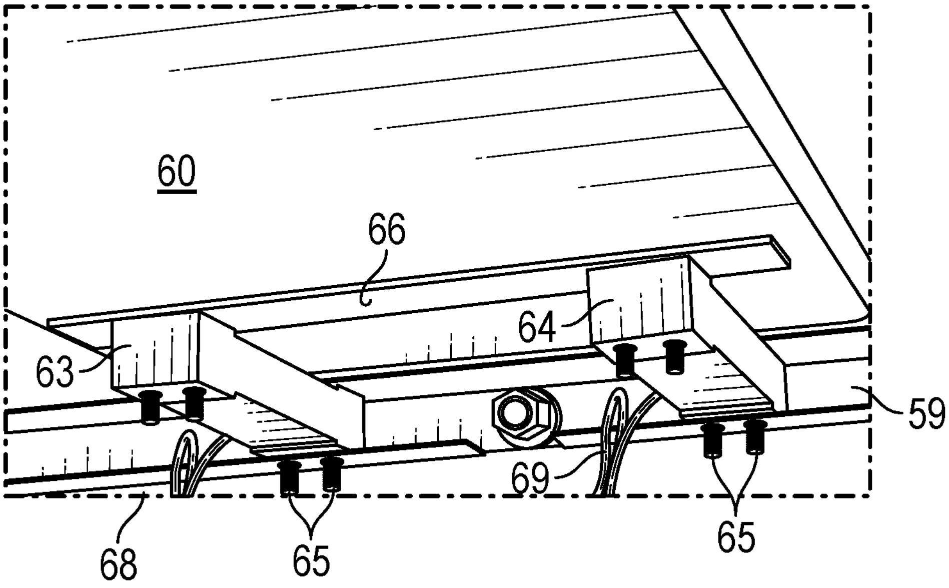
FIG. 2C is a close-up underside perspective view of one (front or back) end of a platform of FIG. 2B resting upon a pair of load sensors. Both front and back ends of each platform have identical pairs of load sensors with corresponding signal connections to a frame of the storage rack of FIG. 2A.

In FIGS. 2B and 2C, the platforms 60 are seen in closeup. They typically rest upon four load cells, two in front and two in back, two of which 63 and 64 are visible from the underside in FIG. 2C. Each load cell 63, 64, etc. is attached via bolts 65 to either of the front or back horizontal crossbars 59 and 61. The load cells 63 and 64 attached to the back crossbar 59 project forward, while corresponding load cells attached to the front crossbar 61 project rearward, to support a platform 60. The underside of the platform 60 may include a horizontal left-to-right resting plate or strip 66 that rests upon a corresponding pair of load cells 63 and 64 (and likewise another resting strip resting on another pair of cells at the front). Each load cell 63, 64, etc. has signal lines 68, 69, etc. that convey load measurement signals to a processor in a manner like that described for FIGS. 1A-1E. Alternatively, only one pair of load cells might be provided (as in the FIGS. 1A-1E) that are attached either to the front crossbar 59 or to the back crossbar 61. Although this would generate some uncertainty when either a single full tank or two empty tanks are present (a signal differential between front and back pairs of load cells helps distinguish the two cases), in many situations this will still be adequate for inventory management, such as at large tank farms where such discrepancies tend to average out.

When a single gas cylinder tank (such as tanks 57 or 58 in FIG. 2A) rests upon a platform 60, the weight of that tank pushes down upon the front pair or back pair of load cells, depending on the position of the tank, front or back on the platform 60. If two tanks are present, the weight of both tanks pushes down upon all four load cells for that platform. Signals from each pair of load cells are treated in parallel by a microprocessor that is connected to receive the signals from those load cells to derive an average signal value from those two weight sensors. Then, different threshold values can be used to obtain a tank status for each storage location in the rack 51. The load cell signal analysis determines whether any tank (one or two) is present on a platform 60 and, if present, whether such tank(s) is/are full or empty. Threshold values can be easily calibrated by loading or removing a full or empty tanks and then registering the resulting load cell signal values obtained from the corresponding front and back pairs of load cells.

The total value of the two pairs of load cells for each platform 60 can indicate tank status using five threshold values. A load cell signal value from zero to a first threshold indicates that no tank is present on that platform. A signal value between first and second threshold levels indicates the presence of a single empty tank. A signal value between second and third threshold levels indicate that there are either two empty tanks or one full tank. A signal value between third and fourth threshold levels indicates one empty tank and one full tank. A signal value between fourth and fifth thresholds indicates the presence of two full tanks on the platform. A signal value above the fifth threshold is regarded as a blowout value (i.e., sensor reading error).

To resolve the ambiguity that occurs when the sensor signal is between the second and third thresholds (either two empty tanks or one full tank), when both front and back pairs of load cells are provided on each platform, a difference between the two pairs of sensor measurements in the two zones (i.e., an absolute value of the back measurement pair minus the front measurement pair) is calculated. A differential value that exceeds a differential threshold will indicate the presence of one full tank (assuming the single tank is not centered on the platform, but properly placed at the back of the platform). When the differential value is below the differential threshold, the presence of two empty tanks is indicated. To account for user error in placing a single tank on the platform, the differential threshold can be set low enough to eliminate all but the most centered placements. The absolute value of the differential is preferably used to account for the possible placement of a single tank at the front of the platform.

By processing the output signals from groups of load cells, a gas cylinder inventory for each storage rack can be maintained. The processor coupled to receive the load cell signals would determine the presence or absence of gas cylinders at each storage location and their fill state (full or empty). Each storage rack has a specific number of storage locations, whether on parallel rails or on two-tank platforms, that determines the rack's storage capacity. In most storage rack implementations, the racks would store tanks of a single shape and size and containing one specific species of gas. But, in some implementations, a storage rack might store tanks with the same shape and size but different gas contents. For example, different shelves of the storage rack might be loaded with cylinders storing different gases. Still further, it is possible that a storage rack might be constructed to be capable of holding tanks of different types (with the same or different gas species). In the latter case, the load cell threshold values would need to be specific to the type of gas cylinders being stored at each location of a rack. The gas inventory would need to have the location of each different type, if multiple types are permitted, entered by the user when tanks are loaded. The gas cylinder inventory would then represent a count of gas cylinders of each type and their fill state.

A local server may be networked (either wireless or wired) to a plurality of storage racks for tracking an overall inventory. (Each storage rack or each shelf of a rack could have its own processor for determining that rack's or shelf's inventory and report it to the local server, or the load sensor signals could be reported to the local server where a processor would determine the inventory.) A remote server or portal in communication with the local server (e.g., via the Internet or cloud cellular service) may receive the gas cylinder inventory information and have tank cylinder management software that orders replacement tanks and optimizes delivery. For example, the remote server would have information regarding the capacity of each storage rack for each gas cylinder type (size, shape, gas species, etc.), which could be a user-defined maximum number of tanks (even when the rack could potentially hold more tanks), and a user-defined replacement threshold that would trigger an order for replacement cylinders under specified conditions (such as one of the tank types falling below its specified replacement threshold). Accordingly, the tank cylinder management software running on the remote server would generate an order signal representing a specified number of replacement cylinders of each type whenever those user-specified trigger conditions are met. The management software would determine the number of replacement cylinders to order (e.g., based on user-defined capacity minus the replacement threshold value for that tank type). Optional features can include augmenting any order with numbers of cylinders of other gas types, which though still above the replacement threshold are less than the capacity for each gas type. It can also aggregate orders from a plurality of storage racks.

For tank farms spread over a large area, mobile devices could be in communication with the remote server to display the tank inventory at that tank farm and any pending orders of replacement gas cylinder tanks and corresponding storage rack locations. Such mobile devices could also allow an authenticated user to set or reset threshold amounts through the communications link with the remote server.

What is claimed is:

1. A gas cylinder tank storage rack with signaled tank status, comprising a frame structure with a set of shelves disposed above one another with storage locations for a plurality of gas cylinder tanks, each shelf resting upon a plurality of load cells fixed to the frame structure, the load cells coupled together to register in tandem a weight of one of the plurality of gas cylinder tanks present on one of the shelves resting upon the load cells, output signals from the load cells being associated with a set of threshold values that indicate the presence or absence of a respective one of the plurality of gas cylinder tanks on the respective shelf and a fill state of the respective gas cylinder tank.

2. A gas cylinder tank storage rack as in claim 1, wherein each of the shelves comprise parallel rails attached at one end of the rails via hinges to a crossbar of the frame structure and each rail resting at an opposite end of the rails upon a pair of the load cells fixed to another crossbar of the frame structure, each of the plurality of gas cylinder tanks being disposed horizontally upon the parallel rails of a respective one of the shelves.

3. A gas cylinder tank storage rack as in claim 2, wherein the load cell output signals from the load cells are associated with three threshold values to indicate respectively (1) one of the plurality of gas cylinder tanks being absent, (2) an empty one of the plurality of gas cylinder tanks being present, and (3) a full one of the plurality of gas cylinder tanks being present.

4. A gas cylinder tank storage rack as in claim 2, wherein each hinge is in the form of respective downwardly curved endpieces of the parallel rails fitted into a respective slot in the crossbar of the frame structure, the crossbar being horizontal, the hinge permitting an amount of vertical pivoting that accommodates the respective load cell at the opposite end of the respective rail.

5. A gas cylinder storage tank as in claim 2, wherein pairs of the parallel rails are laterally spaced apart by a distance less than a tank diameter of one of the plurality of gas cylinder tanks to be supported by the pair of rails.

6. A gas cylinder storage tank as in claim 2, wherein pairs of the parallel rails are laterally spaced from adjacent pairs of the parallel rails by an amount that allows clearance between adjacent tanks of the plurality of gas cylinder tanks supported by those adjacent pairs of rails.

7. A gas cylinder storage tank as in claim 2, wherein each load cell is mounted to the crossbar of the frame structure to horizontally project toward a corresponding one of the parallel rails, the corresponding rail resting upon the load cell.

8. A gas cylinder tank storage rack as in claim 1, wherein the shelves each comprise horizontal platforms resting upon at least one pair of the load cells fixed to any of opposite front and back crossbars of the frame structure, the plurality of gas cylinder tanks being uprightly disposed upon the platforms.

9. A gas cylinder tank storage rack as in claim 8, wherein each platform holds up to two of the plurality of gas cylinder tanks and the load cell output signals are associated with five threshold values to indicate respectively (1) none of the plurality of gas cylinder tanks being present, (2) a single empty one of the plurality of gas cylinder tanks being present, (3) either two empty ones of the plurality of gas cylinder tanks being present or one full one of the plurality of gas cylinder tanks being present, (4) one empty one of the plurality of gas cylinder tanks being present and one full one of the plurality of gas cylinder tanks being present, and (5) two full ones of the plurality of gas cylinder tanks being present.

10. A gas cylinder tank storage rack as in claim 9, wherein front and back pairs of the load cells are fixed to both front and back crossbars and a threshold differential value between the front and back pairs of load cells distinguish between the two empty gas cylinder tanks being present and the one full gas cylinder tank being present.

11. A gas cylinder tank storage rack as in claim 8, wherein each load cell is mounted to one of the front and back crossbars of the frame structure to horizontally project toward the platform, the platform resting upon four of the load cells, one pair of the load cells at a front end of the platform and another pair of the load cells at a back end of the platform.

12. A gas cylinder tank storage rack as in claim 1, wherein the load cell sensor output signals are coupled to a processor, the processor treating the sensor output signals from a group of the load cells in tandem to obtain an average load value, and the processor using the average load value and threshold values to determine a tank inventory state for the storage rack representing a map of full and empty ones of the gas cylinder tanks present.

13. A gas cylinder tank storage rack as in claim 12, wherein the processor is in communication with a server running tank inventory management software, the server receiving the tank inventory state from the processor and facilitating ordering of replacements of the plurality of gas cylinder tanks under user-specified conditions.

14. A gas cylinder tank storage rack as in claim 13, wherein the user-specified conditions include a specified replacement threshold number of the full gas cylinder tanks present in the storage rack, the replacement threshold being set to a value less than a tank capacity of the storage rack.

15. A method of determining an inventory of a gas cylinder storage rack, comprising:

providing a set of shelves with storage locations for a plurality of gas cylinder tanks, each shelf resting upon a plurality of load cells fixed to a storage rack frame structure, the load cells coupled together to register in tandem a weight of one of the plurality of gas cylinder tanks present on one of the shelves; and processing output signals from the load cells using an associated set of threshold values to indicate the presence or absence of a respective one of the Plurality of gas cylinder tanks on the respective shelf and a fill state of the respective gas cylinder tank and to determine an inventory state of the storage rack representing a map of full and empty ones of the plurality gas cylinder tanks present.

16. A method as in claim 15, wherein each of the shelves are in the form of parallel rails attached at one end of the rails via hinges to a crossbar of the frame structure and each rail resting at an opposite end of the rails upon a pair of the load cells fixed to another crossbar of the frame structure, each of the plurality of gas cylinder tanks being disposed horizontally upon the parallel rails of a respective one of the shelves, and further wherein the load cell output signals are associated with three threshold values to indicate respectively (1) one of the plurality of gas cylinder tanks being absent, (2) an empty one of the plurality of gas cylinder tanks being present, and (3) a full one of the plurality of gas cylinder tanks being present for each set of the parallel rails.

17. A method as in claim 15, wherein each of the shelves are in the form of horizontal platforms resting upon at least one pair of the load cells fixed to any of opposite front and back crossbars of the frame structure, the plurality of gas cylinder tanks being uprightly disposed upon the platforms.

18. A method as in claim 17, wherein each platform holds up to two of the plurality of gas cylinder tanks and the load cell output signals are associated with five threshold values to indicate respectively (1) none of the plurality of gas cylinder tanks being present, (2) a single empty one of the plurality of gas cylinder tanks being present, (3) either two empty ones of the plurality of gas cylinder tanks being present or one full one of the plurality of gas cylinder tanks being present, (4) one empty one of the plurality of gas cylinder tanks being present and one full one of the plurality of gas cylinder tanks being present, and (5) two full ones of the plurality of gas cylinder tanks being present on a corresponding one of the platforms.

19. A method as in claim 18, wherein front and back pairs of the load cells are fixed to both front and back crossbars and a threshold differential value between the front and back pairs of load cells distinguishes between the two empty gas cylinder tanks being present and the one full gas cylinder tank being present.

* * * * *